April 17, 1934.    H. A. HICKS    1,955,185
AIRPLANE
Original Filed Nov. 4, 1927    3 Sheets-Sheet 1

INVENTOR.
Harold A. Hicks.
BY C. R. Halbert.
E. L. Davis.
ATTORNEYS.

April 17, 1934. H. A. HICKS 1,955,185
AIRPLANE
Original Filed Nov. 4, 1927 3 Sheets-Sheet 2
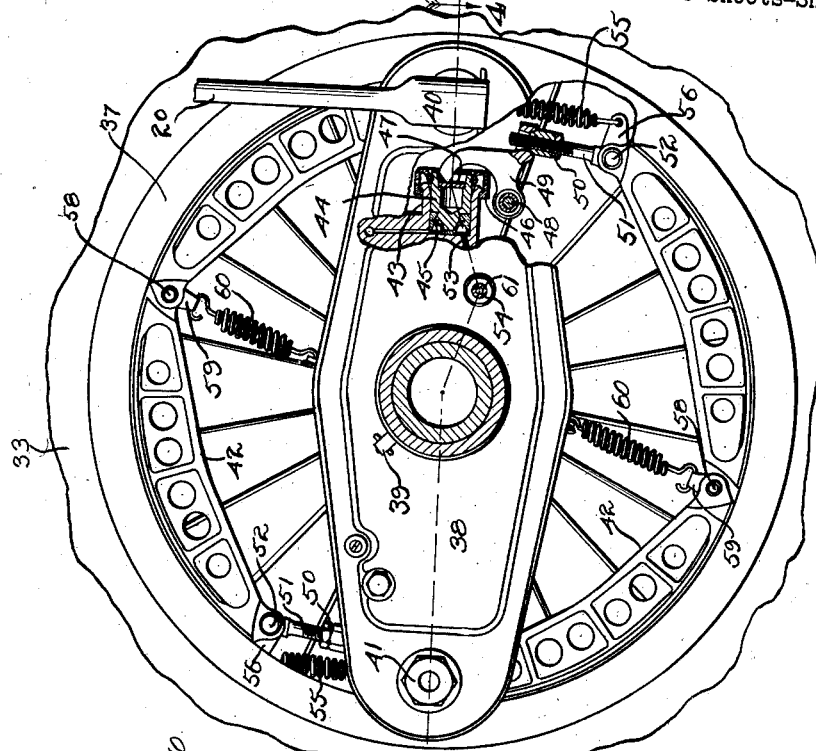
Fig. 3
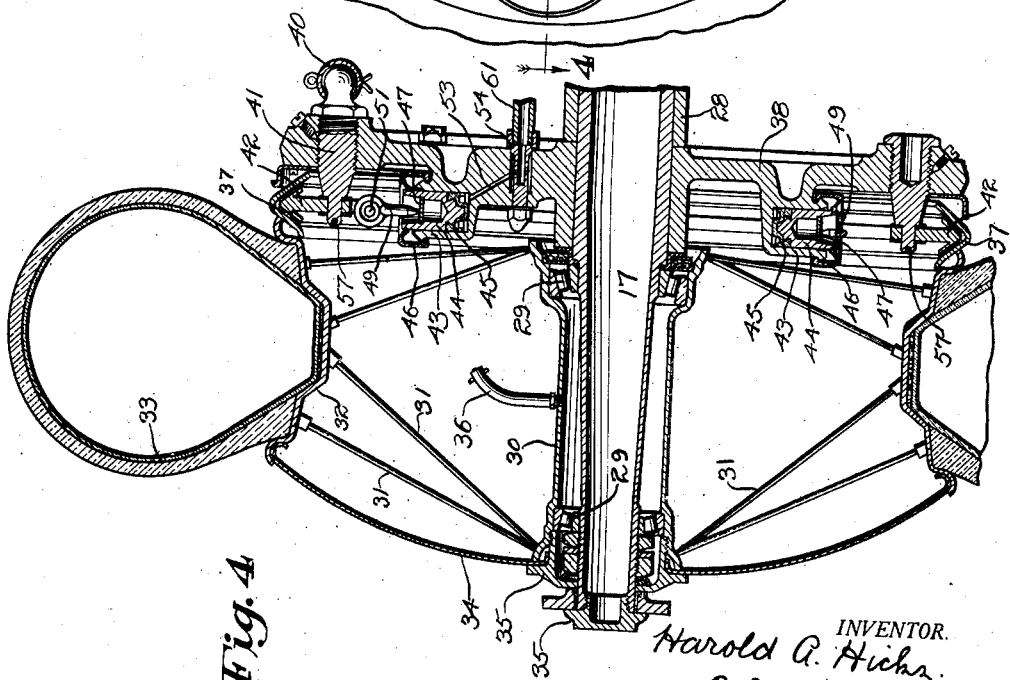
Fig. 4

April 17, 1934.  H. A. HICKS  1,955,185
AIRPLANE
Original Filed Nov. 4, 1927   3 Sheets-Sheet 3

INVENTOR.
BY Harold A. Hicks.
C. R. Halbert.
E. L. Davis.
ATTORNEYS.

Patented Apr. 17, 1934

1,955,185

UNITED STATES PATENT OFFICE 1,955,185

AIRPLANE

Harold A. Hicks, Detroit, Mich., assignor to Ford Motor Company, Highland Park, Mich., a corporation of Delaware Application November 4, 1927, Serial No. 230,995
Renewed January 25, 1933

17 Claims. (Cl. 244—2)

The object of my invention is to provide an airplane of simple durable and inexpensive construction.

Still a further object of my invention is to provide an airplane which may be readily taxied on the ground and which may be stopped in a minimum distance when landing.

Still a further object of my invention is to provide an airplane having brakes on the front wheels and a caster wheel at the back to stop the airplane when landing.

Still a further object of my invention is to provide an airplane having a pair of front wheels each having individually operable brakes and a castor wheel at the back, whereby the brakes may be operated selectively or together to stop of steer the airplane when the latter is taxiing along the ground.

Still a further object of my invention is to provide a single control lever which may apply both or either of the brakes for the two front wheels of an airplane.

Still a further object of my invention is to provide a hydraulic brake system for an airplane whereby maximum reliability may be secured and minimum weight required.

With these and other objects in view, my invention consists in the arrangement, construction, and combination of the various parts of my improved device as described in the specification, claimed in the claims, and illustrated in the accompanying drawings, in which:

Figure 3 shows the elevation of the inner side of one of my improved brake constructions.

Figure 4 shows a sectional view taken on line 4—4 of Figure 3.

Figure 2:
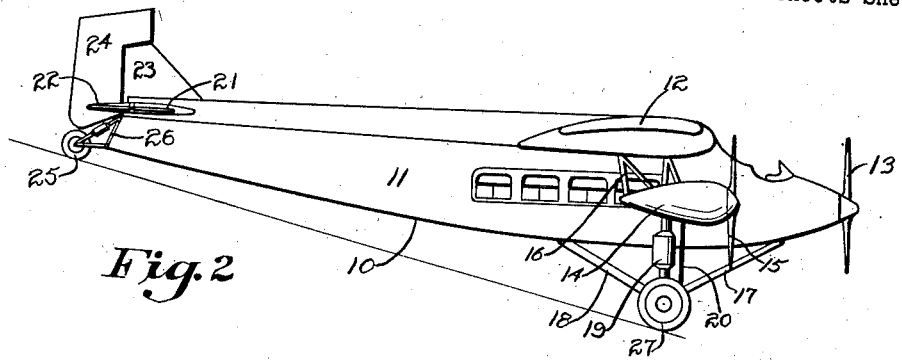
Figure 2 shows a side elevation of the airplane shown in Figure 1.
Figure 1:
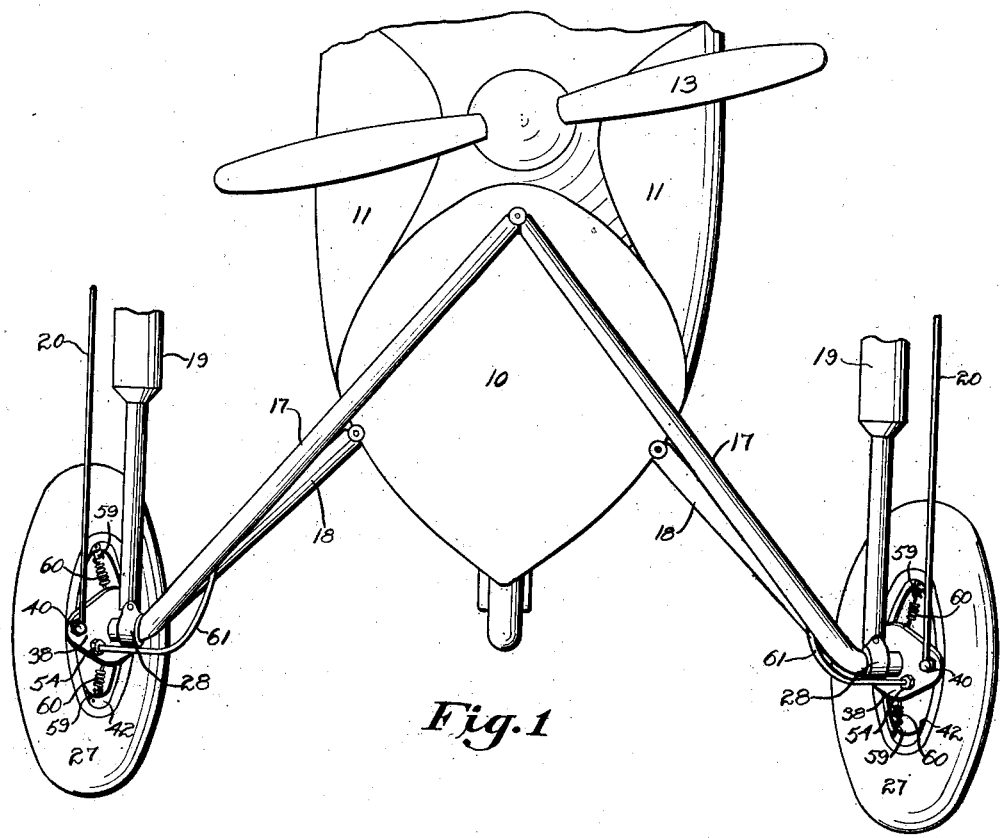
Figure 1 shows a perspective view of the front of an airplane constructed in accordance with my invention.
Figure 5:
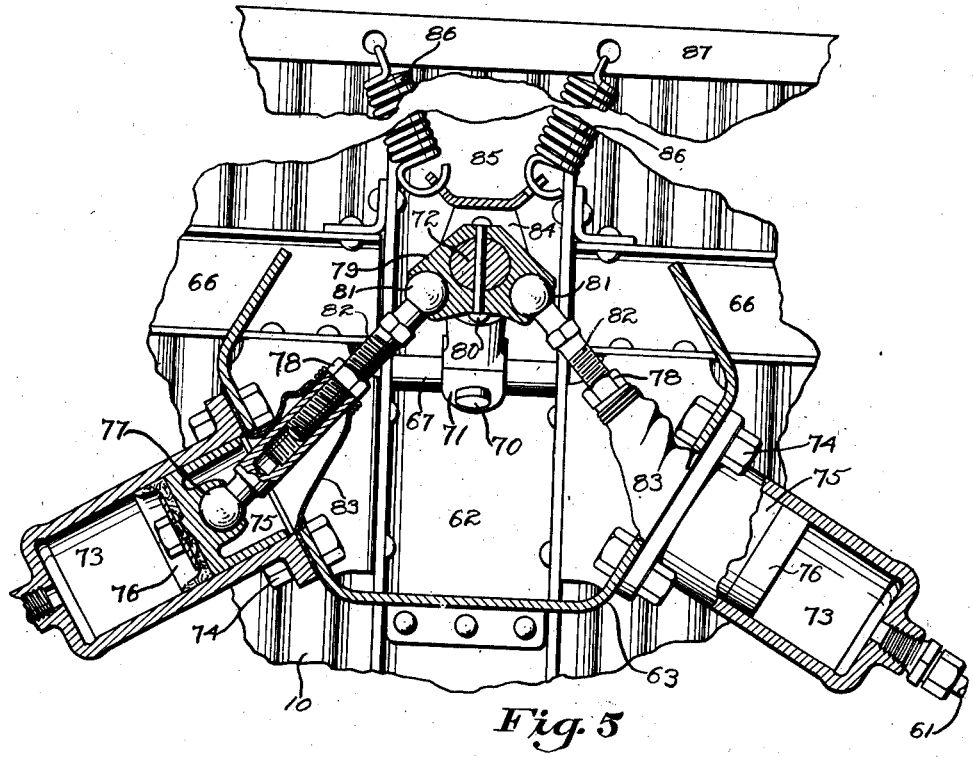
Figure 5 shows a horizontal sectional view of the cylinders which operate my improved brake system.
Figure 6:
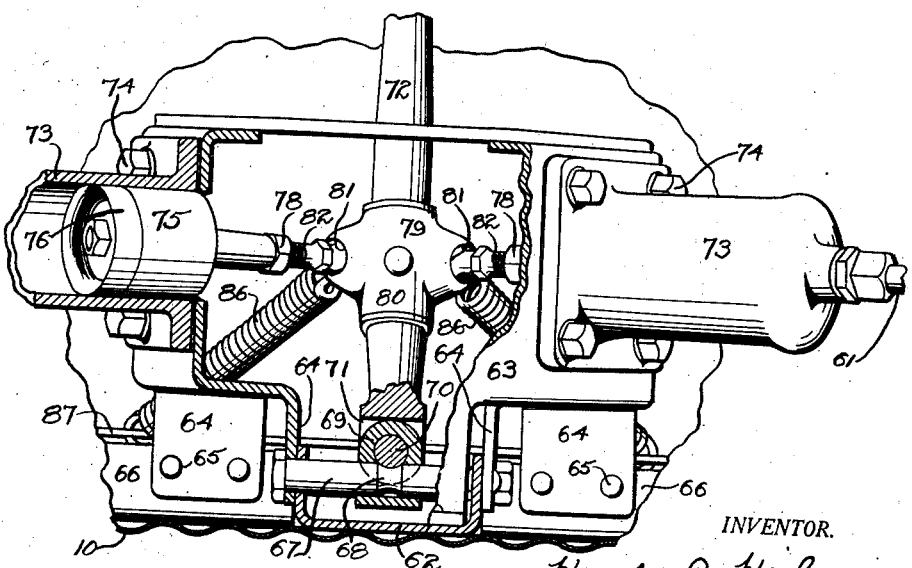
Figure 6 shows a front elevation of said mechanism, parts being broken away to better illustrate the construction.

Referring to the accompanying drawings I have used the reference numeral 10 to indicate generally the floor of the fuselage having the sides 11. Wings 12 are carried by the fuselage and a central propeller 13 is disposed at the front end of the fuselage. Engine nacelles 14 are disposed at either side of the fuselage in position spaced therefrom and carry the side propellers 15. The nacelles 14 are supported from the wing by struts 16.

The tail of the fuselage together with the wings 12 are provided with conventional controlling surfaces, i. e. ailerons, elevators and a rudder. A control lever is disposed in the fuselage to operate these surfaces thereby guiding the plane in the conventional manner.

The forward end of the fuselage is supported by struts 17, 18, and 19, the first two mentioned struts being connected directly to the fuselage and the latter with the engine nacelles 14. Tension rods or struts 20 also extend from the wheel mountings up to the engine nacelles 14.

The rear end of the fuselage is provided with stabilizers 21, elevators 22, a vertical fin 23, and a rudder 24; a caster tail wheel 25 is journaled to swing on the tail post 26. The front end of the fuselage is supported by the wheels 27 which are suitably mounted for rotation and connected with the struts 17, 18, 19 and 20 to support the airplane.

The parts heretofore described are not further described in detail as they may be said to be constructed in accordance with ordinary airplane engineering and they form no part of my invention except in so far as they cooperate with the various parts of my improved construction. The struts 17 have their lower ends tapered to form the axle for the front wheels. Near the ends of the struts 17, the collar 28 is rotatably mounted on the strut 17 and the struts 18 and 19 are pivotally connected to the collar 28 to thereby form a tripod support for the fuselage relative to the wheels. Roller bearings 29 serve to rotatably support the wheel hub 30. This hub carries spokes 31 which in turn carry the rim 32. A tire 33 is mounted on the rim 32 and a stream line plate 34 extends between the rim 32 and the hub 30 and these parts are secured to the axle portion of the strut 17 by nuts 35. A grease fitting 36 is tapped into the hub 30 to permit lubrication of the bearings 29. The rim 32 has a brake drum 37 of angular cross section secured to the inner edge thereof in any suitable manner as by welding. A brake anchor plate 38 of generally oval outline is rotatably mounted on the axle portion of the strut 17 between the collar 28 and the hub 30. A grease fitting 39 may be tapped into the brake anchor plate 38 to insure lubrication of the bearing between this brake anchor plate and the adjacent portion of the strut 17. The torque on this brake anchor plate caused by the actuation of the brakes is resisted by the tension strut 20 which is connected by the ball and socket joint 40 with the brake anchor plate 38. The upper end of this tension rod 20 is connected in any suitable way to the nacelles 14 or the upper end of the strut 19.

Studs 41 extend through the brake anchor plate 28 near each end thereof and form a fixed pivotal support for one end of the brake shoes 42, these brake shoes having working faces of angular section to co-act with the angular section of the brake drum 37. Two, two-part brake shoes 42 are used in connection with each wheel and one end of each shoe is mounted on the pivot formed by the studs 41. It will be noted that the front stud 41 is extended so its head forms the ball of the ball and socket joint 40 which connects the tension struts 20.

Hydraulic brake operating cylinders 43 are cast integral with the brake anchor plate 38 at either end thereof and approximately midway between the studs 41 and the wheel axle. Pistons 44 having gaskets 45 secured to the inner ends thereof are disposed in these cylinders 43. These pistons have an oil retaining flexible skirt 46 which has one edge united with the outer edge of the piston 43 and the other edge united with the outer edge of the cylinder 43 so that leakage of the oil or other operating fluids for the brakes is prevented. These pistons 44 are cast from light and relatively soft metals such as aluminum alloys, and a wear plate of hard material 47 is secured in the hollow center of the pistons 44 in any suitable manner as by means of integral shoulders and a "press fit" joint. A stud 48 mounted in the brake anchor plate 38 forms a pivotal support for the lever 49 which operates the brake shoes 42. One end of this lever bears against the wear plate 47 and the other end is provided with a socket designed to co-act with a nut 50 which is mounted on a pin 51 which in turn is pivotally connected at 52 to the free end of the brake shoe 42. Ducts 53 are drilled through the brake anchor plate 38 so that one end thereof can communicate with the inner end of the cylinders 43. The other end of these ducts communicate with a fitting 54 which extends through the brake anchor plate and is adapted to have a supply tube 61 connected thereto. The free ends of the brake shoes 42 are retracted by springs 55 which are connected to an ear 56 which extends from the free end of the brake shoes 42. The other end of this spring 55 is connected to the adjacent stud 41 in any suitable manner as by passing through a hole 57 in the ends thereof.

From the foregoing description it will be seen that if oil be forced through the supply tube 61, it will enter the space between the gasket 45 and the bottom of the cylinder 43 thereby pressing the pistons 44 outwardly of the cylinder. This movement of the pistons 44 swings the levers 49 thereby spreading the brake shoes 42 into contact with the brake drum 37. Retraction of the brake is accomplished by the springs 55 and 60. The shoes 42 are made in two pieces which are pivoted together at their adjacent ends as at 58. An ear 59 mounted on this pivot 58 is connected to a spring 60 which has its outer end connected to the brake anchor plate 38. By this construction I am enabled to secure the self energizing action of each of the two part brake shoes 42 so that the rotation of the wheels will also serve to actuate the brake shoes.

The tube 61 is extended up into the fuselage to the brake actuating cylinders in any suitable way. The floor 10 of the fuselage has a "U" section central longéron 62 disposed adjacent thereto. A housing 63 has tabs 64 extended therefrom which are secured by rivets 65 to cross struts 66 in the bottom of the fuselage. A shaft 67 extends across between the tabs 64 and along and through the longéron 62 and has an annular groove 68 at the center thereof. A fitting 69 is rotatably mounted on the shaft 67. A second shaft 70 extends through the fitting 69 at right angles to the shaft 67 and a portion of the surface of the shaft 70 enters the groove 68 in the shaft 67. A fork 71 at the bottom of my brake control lever 72 is pivotally mounted on the ends of the shaft 70. From the construction just described it will be seen that the hand lever 72 has universal movement relative to the bottom of the housing 63.

The housing 63 has hydraulic cylinders 73 bolted thereto by bolts 74, these cylinders being disposed with their axes in the same horizontal plane but forming approximately a ninety degree angle with each other. The other end of these cylinders 73 are connected to the tubes 61 in any suitable manner. Pistons 75 have flexible skirts 76 at their inner ends and are designed to be connected by a ball joint 77 with the connecting rods.

These connecting rods are made extensible by making one section thereof hollow and interior threaded and the other sections solid and exterior threaded whereby they may be screwed into each other and then locked into their adjusted positions by locking nut 78. The fitting 79 is fixed to the lever 72 in position spaced from the bottom thereof by a rivet 80. This fitting 79 has ball joint connections 81 with the ends of the connecting rods 82.

Boots 83 of flexible material have one of their ends connected to the exterior of the connecting rod and their other ends there fitted between the housing 63 and the flanges of the cylinders 73 to form a liquid tight joint and prevent leakage of the brake operating fluid around the pistons 75.

The fitting 79 is provided with an extension 84 having an upwardly extending portion 85 designed to have springs 86 secured thereto. The other ends of these springs 86 are secured to fuselage floor strut 87. These springs 86 extend at an angle to each other and are arranged to pull the pistons 75 out of the cylinders 73, that is, to move the parts to retracted position of the brakes. The lever 72 is so positioned relative to the cylinders 73 that when it is moved rearwardly then there is a gradually increasing or toggle action between the connecting rods and the lever and the pistons which tends to augment the force with which the brakes can be applied as the lever 72 near the end of its stroke.

From the foregoing description of the mounting and construction of the brake controlling device, it will be seen that the lever 72 will normally be returned to its inoperative forward position by the springs 86. When it is desired to apply both brakes, the lever 72 is pulled rearwardly. If it is pulled directly rearwardly both brakes will be applied equally and the airplane will be brought to a stop. If however, the airplane is being taxied along the ground, then the brake may be pulled rearwardly and sideways towards the side toward which it is desired to turn the airplane. This will apply only the brake on that side and cause the airplane to swing around the wheel on which braking effort is applied.

It should be pointed out that this improved system of controlling the movement of airplanes over the ground has proven very satisfactory as it enables the operator in taxiing the machine on the ground to turn it around on a radius not exceeding appreciably the length of the airplane. Moreover the movements of the plane may very nicely be controlled to move the airplane about as may be desired. It will no doubt be appreciated that it is highly important to be able to move a bulky object such as an airplane at relatively low speed and under perfect control when moving it around the landing field or into the hangars. This construction permits the operator to move the machine around on the ground at practically any speed he may desire and in any direction or may control the speed or direction of the machine or both by applying both or either of the brakes. It will be noted that means are provided for adjusting the action of the brake shoes and of the pistons in the operating cylinder 73. The means necessary to operate these brakes are relatively simple, and all the parts can be made relatively strong without adding a large weight to the plane.

Among the many advantages arising from the use of my improved airplane, it should first be noted that the airplane may be readily stopped when landing without injury to any of the plane parts or to the landing field. It may then be run under control at any speed in any direction. The plane may also be pushed around by hand if desired.

Some changes may be made in the arrangement and construction of the various parts of my improved airplane without departing from the spirit of my invention, and it is my intention to cover by my claims such changes as may reasonably be included within the scope thereof.

I claim as my invention:

1. In an airplane, a fuselage, a pair of spaced supporting wheels therefor, brake means for said supporting wheels, a hydraulic cylinder associated with each of said brake means, a lever mounted for universal movement in said fuselage, a pair of spaced cylinders disposed adjacent to said lever, means for connecting said cylinders with the brake operating cylinders, and means for connecting the second described cylinders with said lever whereby movement of the lever in one plane may apply said brake mechanism equally and deviation from the said plane will apply the mechanism in proportion to the deviation from said plane.

2. In a brake operating mechanism for airplane brakes, a casing, a pair of cylinders mounted thereon with their axes in the same plane but forming an angle with each other, a lever mounted for universal movement on said casing, pistons in said cylinders, and connecting rods universally connected to said pistons and to said lever whereby said lever may be swung to operate both pistons the same distance or unequal distances.

3. In an airplane, a fuselage, a lever mounted therein for universal movement, a pair of cylinders mounted adjacent thereto with their axes in the same plane but forming an angle with each other, pistons in said cylinders, connecting rods connected for universal movement to said pistons and said lever, and springs adapted to operate on said lever to urge it in a direction to withdraw said pistons from said cylinders.

4. In an airplane, a fuselage and wing assembly, landing gear for said assembly including strut supported axles and wheels loose on said axles, and brake mechanism for each wheel, each mechanism including a support mounted for rotation on the axle adjacent the wheel, cooperating relatively adjustable friction brake members carried by the support and wheel, means for transmitting the torsional force acting on said support during application of the brake directly to said assembly independently of the axle struts, and means for actuating said brake mechanisms.

5. In an airplane, a fuselage and wing assembly, an axle connected to said assembly, a wheel on said axle, brake mechanism associated with the wheel and axle, and means connected directly to said assembly for relieving the axle of the torsional strains set up during the application of the brake.

6. In an airplane, a fuselage and wing assembly, an axle connected to the said assembly, a wheel on said axle, brake mechanism associated with the wheel and axle, and a strut connected between the brake mechanism and the said assembly for relieving the axle of the torsional stresses set up during the application of the brake.

7. In combination, an airplane assembly including a pair of landing wheels, a fluid actuated brake device for each wheel, an independent fluid pressure creating device for each brake device, and a single control rigidly connected to both pressure creating devices for independently, differentially, or uniformly actuating said fluid pressure creating devices, depending upon the path of movement of the control, to operate the brake devices for steering and/or stopping the airplane.

8. In combination, an airplane assembly including a pair of landing wheels, a fluid actuated brake device for each wheel, an independent fluid pressure creating device for each brake device, a single control rigidly connected to both pressure creating devices for independently, differentially, or uniformly actuating said fluid pressure creating devices to operate the brake devices for steering and/or stopping the airplane, and a supporting frame member common to said fluid pressure creating devices and said control.

9. In an airplane, a fuselage, a control element mounted for movement in said fuselage, a pair of fluid pressure creating devices mounted in said fuselage at an angular relation substantially less than 180° with respect to each other, rigid connections between said element and the devices constructed to render said devices operative to produce different degrees of pressure depending upon the extent of movement of the element relative to both devices, and a landing wheel brake mechanism operatively connected to each device and actuated to an extent dependent upon the amount of pressure created by its device.

10. In an airplane, a fuselage, a control lever adapted to have universal movement, a pair of fluid pressure creating devices, means for mounting said lever and said devices in the fuselage so that they will always have an angular relation substantially less than 180° with respect to each other, rigid connections between said lever and said devices constructed to render said devices operative to produce different degrees of pressure depending upon the extent of movement of the lever relative to both devices, and a landing wheel brake mechanism operatively connected to each device and actuated to an extent dependent upon the amount of pressure created by its device.

11. In an airplane, a fuselage, a control element mounted for movement in said fuselage, a pair of fluid pressure creating devices mounted in said fuselage in predetermined spaced relation with respect to said element, connections between said element and the devices constructed to render said devices operative to produce different degrees of pressure, depending upon the extent of movement of the element relative to the devices, means for yieldably retarding movement of the element toward each of said devices, and a landing wheel brake mechanism operatively connected to each device and actuated to an extent dependent upon the amount of pressure created by its device.

12. In an airplane, a fuselage, a control element mounted for movement in the fuselage, a pair of fluid pressure creating devices mounted in said fuselage in predetermined relation with respect to said element, connections between said element and the devices constructed to render said devices operative to produce different degrees of pressure, depending upon the extent of movement of the element relative to the devices, said connections being independently adjustable to permit regulation of said devices relative to each other, and a landing wheel brake mechanism operatively connected to each device and actuated to an extent dependent upon the amount of pressure created by its device.

13. In an airplane, a fuselage, a pair of fluid pressure creating devices mounted in said fuselage in an angular relation substantially less than 180° with respect to each other, each of said devices having a movable element, the extent of movement of which determines the amount of pressure created by its device, a movable control element mounted in the fuselage in predetermined spaced relation with respect to said devices, rigid connections between said control element and the movable elements of said devices, the control element being adapted to move relative to said devices in a manner to cause the devices to create pressure of uniform or differential values, and a landing wheel brake mechanism operatively connected to each device to be actuated by the pressure created thereby.

14. In an airplane, a fuselage, a pair of fluid pressure creating devices mounted in said fuselage in predetermined relation with respect to each other, each of said devices having an element movable in a plane which converges with the similar plane of the element for the other device, the extent of movement of each element being employed to determine the amount of pressure created by its device, a lever connected to both of said elements and mounted for movement in a single plane which crosses the intersection of the aforementioned planes for moving said elements simultaneously and uniformly or in directions deviating from said single plane to vary the extent of movement of said elements in proportion to said deviation, and a landing wheel brake mechanism operatively connected to each device to be actuated by the pressure created thereby.

15. In combination, an airplane having a pair of laterally spaced landing wheels, a brake and operating mechanism for each of said wheels, a control element mounted for universal movement, and a rigid operative connection between said control element and each of said brake operating mechanisms, said elements being constructed and arranged to cause one or both of the brakes to be applied in accordance with all movements of the control element.

16. In combination, an airplane having a pair of laterally spaced landing wheels, a brake and operating mechanism for each of said wheels, and a single lever rigidly connected to said operating mechanisms for differentially applying said brakes in accordance with all movements of said means, whereby the plane may be simultaneously steered and stopped.

17. In combination, an airplane having a pair of laterally spaced landing wheels, a brake and operating mechanism for each of said wheels, and means for differentially applying said brake operating mechanisms, whereby the plane may be simultaneously steered and stopped, said means including a single lever control element rigidly connected to said operating mechanism and movable at all times in accordance with the extent of application thereof.

HAROLD A. HICKS.